United States Patent
Wang et al.

(10) Patent No.: US 8,034,455 B2
(45) Date of Patent: Oct. 11, 2011

(54) COATING COMPOSITION, SUBSTRATES COATED THEREWITH AND METHODS OF MAKING AND USING SAME

(75) Inventors: Fei Wang, Fremont, CA (US); Philip Chihchau Liu, Fremont, CA (US)

(73) Assignee: NovaSolar Holdings Limited, Tortola (VG)

( * ) Notice: Subject to any disclaimer, the term of this patent is extended or adjusted under 35 U.S.C. 154(b) by 218 days.

(21) Appl. No.: 12/155,601

(22) Filed: Jun. 6, 2008

(65) Prior Publication Data

US 2009/0301561 A1    Dec. 10, 2009

(51) Int. Cl.
*B32B 27/00* (2006.01)
*B32B 27/40* (2006.01)

(52) U.S. Cl. ......... 428/423.3; 522/173; 522/64; 522/83; 522/74

(58) Field of Classification Search .............. 522/96, 522/173, 64, 83, 74; 427/496–521; 428/423.3
See application file for complete search history.

(56) References Cited

U.S. PATENT DOCUMENTS

| | | | |
|---|---|---|---|
| 5,482,571 A | 1/1996 | Yamada et al. | |
| 6,475,621 B1 * | 11/2002 | Kohli et al. | 428/411.1 |
| 6,545,064 B1 * | 4/2003 | Bilodeau | 522/7 |
| 6,749,946 B1 * | 6/2004 | Xu | 428/457 |
| 6,905,735 B2 * | 6/2005 | Krohn | 427/516 |
| 7,151,123 B2 * | 12/2006 | Ramsey | 522/96 |
| 7,341,791 B2 * | 3/2008 | Mirone et al. | 428/476.3 |
| 2002/0004537 A1 | 1/2002 | Krongauz et al. | |
| 2009/0188559 A1 * | 7/2009 | Nesbitt | 136/256 |

OTHER PUBLICATIONS

International Search Report for Appln No. PCT/US2009/003373, mailed on Jul. 20, 2009.
International Preliminary Report on Patentability for Appln No. PCT/US2009/003373, mailed Dec. 6, 2010.

* cited by examiner

*Primary Examiner* — Susan W Berman
(74) *Attorney, Agent, or Firm* — Schwabe, Williamson & Wyatt, P.C.

(57) ABSTRACT

Multilayer radiation curable liquid coating compositions are provided that include one or more UV oligomers including at least one aliphatic urethane acrylic oligomer; at least one acrylate diluent monomer selected from a mono-, bi-, and tri-functional reactive acrylate diluent monomers; at least one photo-initiator; at least one UV absorber; at least one hindered amine light stabilizer; and at least one antioxidant, where the liquid composition does not comprise a solvent and does not comprise an adhesion promoter. The UV oligomer in the base coat composition has elongation higher than 200% and tensile strength lower than 1000 psi. The UV oligomer in the top coat composition has tensile strength higher than 5000 psi. A coating system is provided that includes a liquid primer coat composition, a liquid base coat composition and a liquid top coat composition. The cured film has good electrical insulation and UV resistance, and passes thermal cycle, damp heat and humidity freezing tests that are part of UL certification processes. The coating compositions are useful for coating substrates including SiOx substrates.

7 Claims, 1 Drawing Sheet

COATING COMPOSITION, SUBSTRATES COATED THEREWITH AND METHODS OF MAKING AND USING SAME

FIELD

The disclosure relates to coating compositions used for coating substrate surfaces.

BACKGROUND

Thin film solar panels are used outdoors and exposed to wind, rain, snow, and sunlight. Various attempts have been made to protect solar panels for their outdoor application. One of the most common methods is to use a lamination method to laminate the solar cell to a polymer sheet or glass substrate through an adhesive. Ethylene vinyl acetate (EVA) and other low MVTR polymer and silane modified polymers are used as the adhesive. However, such methods have high production cost and as well a discontinuous process.

U.S. Pat. No. 6,500,877 and U.S. Pat. No. 6,905,735 describe ultraviolet light curable paint compositions and method of applying such compositions.

SUMMARY

The present subject matter describes coating compositions and curing methods. The presently described subject matter is directed to UV curable coatings and coating compositions, including for example, a primer coat composition, a base coat composition, and a top coat composition, as well as substrates coated therewith. The coating compositions can be provided on a substrate surface. Suitable substrate surfaces can include a thin film PV module surface. The base coat composition and the top coat composition can be formulated to have 100% solid UV curable compositions, i.e., 100% reactive liquid components in the compositions. Thus, the compositions do not include solvent and therefore have no or very low volatile organic contents (VOC). Formulations with no or low VOC are not only environmentally friendly but also reduce operational costs since they do not need solvent abatement equipment to remove solvent. In addition they do not need to dry out solvent before curing, unlike aqueous or solvent containing formulations.

With regard to the curing method, one advantage of using UV curing is a fast cure which takes only seconds as compared to heat curing which can take minutes or hours. Moisture curing can take even longer time, i.e., hours or days. Further, UV curing is conducted at room temperature and does not require heating the substrate, for example, SiOx.

The described base coat composition provides good adhesion to SiOx and the top coat, high dielectric insulation strength, toughness and flexibility at low temperature. The presently described top coat composition provides good adhesion to the base coating, high dielectric insulation strength, scratch resistance (i.e., mechanical hardness), UV resistance, weathering resistance and flame resistance.

The present subject matter provides durable protection conformal coatings for thin film PV modules. The presently described conformal coatings exhibit very good insulating properties; and thus prevent leak current for the PV module. In order to provide good durability of the PV module in outside environmental conditions, the presently described coatings pass electric insulation, thermal cycle, humidity freezing, and damp heat tests that are part of UL certification processes. The presently described compositions can comprise multi-functional diluting acrylate monomers, non-conductive pigment, silica filler for abrasion resistance and CTE adjustment, along with an aliphatic acrylate oligomer. Furthermore, UVA, HALS and an antioxidant for stabilization of the polymer coatings can be included in the compositions to achieve long lifetime resistance to outside exposure. An adhesion promoter for SiOx is applied with the primer layer and is not formulated in the radiation curable base and top coat composition. The presently described conformal coatings include three coating layers, not a single coating layer. First, there is an ultra thin primer layer to provide good adhesion of the base coating to the SiOx substrate. Second, there is a soft and flexible base coating that functions as a buffer layer and stays soft at low temperatures. Third, there is a hard protection top coating that provides mechanical as well as environmental protection to the PV module.

The presently described coatings pass electric insulation, thermal cycle (between −40° C. to +85° C. at 100° C./h for 200 cycles), humidity freezing (10 cycles from +85° C., 85% RH to −40° C.), and damp heat (1500 hours of +85° C., 85% RH) tests that are part of UL certification processes. After all these accelerating tests, the base coating has no visual defects. The adhesion passes the ASTM 3359 cross hatch adhesion test. The electric insulation passes the dry Hipot: 2200V DC applied for 1 min. leakage current <50 uA and wet Hipot: 500V DC applied for 120 sec. leakage current <10 uA, tests.

The presently described subject matter provides a liquid composition, comprising or consisting of one or more UV oligomers comprising or consisting of at least one aliphatic urethane acrylic oligomer; at least one acrylate diluent monomer selected from a mono-, bi-, and tri-functional reactive acrylate diluent monomers; and at least one photo-initiator; wherein the liquid composition does not comprise a solvent and does not comprise an adhesion promoter.

Further provided is a liquid composition, comprising or consisting of one or more UV oligomers comprising or consisting of at least one aliphatic urethane acrylic oligomer; at least one acrylate diluent monomer selected from a mono-, bi-, and tri-functional reactive acrylate diluent monomers; and at least one photo-initiator; wherein the liquid composition does not comprise a solvent, does not comprise an adhesion promoter, and does not comprise an isobornyl acrylate monomer or the liquid composition comprises a mixture of at least one aliphatic urethane acrylic oligomer and a UV oligomer that is not an aliphatic urethane acrylic oligomer.

The presently described subject matter also provides a liquid composition that is a liquid top coat composition further comprising or consisting of one or more additives selected from the group consisting of a non-conductive pigment; an inorganic filler, a slippery agent, a UV absorber, a hindered amine light stabilizer, a defoamer, an antioxidant, and a cure enhancing agent.

The presently described subject matter further provides a liquid composition that is a liquid base coat composition further comprising or consisting of a UV absorber, a hindered amine light stabilizer, an antioxidant and a leveling agent.

The presently described subject matter further provides a liquid top coat composition comprising or consisting of one or more UV oligomers comprising or consisting of at least one aliphatic urethane acrylic oligomer; at least one acrylate diluent monomer selected from a mono-, bi-, and tri-functional reactive acrylate diluent monomers; at least one photo-initiator; and one or more non-ionic additives selected from the group consisting of a non-conductive pigment, a slippery agent, a UV stabilizer, a defoamer, an antioxidant, an inorganic filler, and a cure enhancer such as an amine synergist, wherein the liquid top coat composition does not comprise a solvent and does not comprise an adhesion promoter.

Also provided is a liquid top coat composition comprising or consisting of one or more UV oligomers comprising or consisting of at least one aliphatic urethane acrylic oligomer; at least one acrylate diluent monomer selected from a mono-, bi-, and tri-functional reactive acrylate diluent monomers; at least one photo-initiator; a non-conductive pigment, and a UV stabilizer.

Provided is a liquid top coat composition comprising or consisting of one or more UV oligomers comprising or consisting of at least one aliphatic urethane acrylic oligomer; at least one acrylate diluent monomer selected from a mono-, bi-, and tri-functional reactive acrylate diluent monomers; at least one photo-initiator; a non-conductive pigment; a slippery agent; a UV stabilizer; a defoamer; an antioxidant; an inorganic filler; and a cure enhancer such as an amine synergist.

A liquid top coat composition is provided that does not comprise a solvent and does not comprise an adhesion promoter.

Additionally provided is a liquid top coat composition for coating a substrate surface, comprising or consisting of one or more UV oligomers comprising or consisting of at least one aliphatic urethane acrylic oligomer; at least one acrylate diluent monomer selected from a mono- and a bi-functional reactive acrylate diluent monomers; at least one photo-initiator; a non-conductive pigment; an inorganic filler, at least one non-ionic wetting agent; at least one non-ionic UV absorber, at least one hindered amine light stabilizer; and at least one non-ionic antioxidant, wherein the liquid top coat composition does not comprise a solvent and does not comprise an adhesion promoter.

The presently described subject matter also provides a liquid top coat composition wherein the at least one aliphatic urethane acrylic oligomer is present in an amount of from about 35% by weight to about 70% by weight; the at least one acrylate diluent monomer is present in an amount of from about 15% by weight to about 30% by weight; the at least one photo-initiator is present in an amount of from about 1% by weight to about 5% by weight; the non-conductive pigment is present in an amount of from about 1% by weight to about 10% by weight, one inorganic filler in an amount of from about 1% by weight to about 10% by weight, the at least one non-ionic slippery agent is present in an amount of from about 0.1% by weight to about 1.5% by weight; at least one non-ionic UV absorber is present in an amount of from about 1% by weight to about 3% by weight; at least one hindered amine light stabilizer is present in an amount of from about 1% by weight to about 3% by weight, and at least one non-ionic antioxidant is present in an amount of from about 0.5 by weight to about 3.5% by weight based on the total weight of the liquid top coat composition.

The presently described subject matter further provides a liquid top coat composition, comprising one or more UV oligomers comprising or consisting of at least one aliphatic urethane acrylic oligomer; at least one acrylate diluent monomer selected from a mono- and a bi-functional reactive acrylate diluent monomer; at least one photo-initiator comprising benzophenone; a non-conductive pigment; at least one non-ionic slippery agent; at least one non-ionic UV absorber; at least one hindered amine light stabilizer; and at least one non-ionic antioxidant, wherein the liquid top coat composition does not comprise a solvent and does not comprise an adhesion promoter.

The presently described subject matter further provides a liquid top coat composition further comprising a non-ionic defoamer.

The presently described subject matter also provides a liquid top coat composition further comprising a cure enhancer.

The presently described subject matter further provides a liquid top coat composition wherein the at least one aliphatic urethane acrylic oligomer is present in an amount of from about 35% by weight to about 70% by weight; the at least one acrylate diluent monomer is present in an amount of from about 15% by weight to about 30% by weight; the at least one photo-initiator is present in an amount of from about 1% by weight to about 5% by weight; the non-conductive pigment is present in an amount of from about 1% by weight to about 10% by weight, the at least one non-ionic wetting agent is present in an amount of from about 0.1% by weight to about 1.5% by weight; at least one non-ionic UV stabilizer is present in an amount of from about 1% by weight to about 5% by weight; and at least one non-ionic antioxidant is present in an amount of from about 0.5 by weight to about 3.5% by weight based on the total weight of the liquid top coat composition.

A liquid base coat composition is provided comprising or consisting of one or more UV oligomers comprising at least one aliphatic urethane acrylic oligomer; at least one acrylate diluent monomer selected from a mono- and a bi-functional reactive acrylate diluent monomer; at least one photo-initiator; and a leveling agent; wherein the liquid composition does not comprise a solvent and does not comprise an adhesion promoter.

Also provided is a liquid base coat composition, wherein the at least one aliphatic urethane acrylic oligomer is present in an amount of from about 35% by weight to about 75% by weight; the at least one acrylate diluent monomer is present in an amount of from about 0% by weight to about 30% by weight; the at least one photo-initiator is present in an amount of from about 1% by weight to about 5% by weight; and the at least one leveling agent is present in an amount of from about 0.1% by weight to about 1% by weight based on the total weight of the liquid base coat composition.

Further provided is a liquid base coat composition, comprising or consisting of one or more UV oligomers comprising or consisting of at least one aliphatic urethane acrylic oligomer; at least one acrylate diluent monomer selected from a mono-, bi-, and tri-functional reactive acrylate diluent monomers; at least one photo-initiator; and a non-ionic leveling agent, wherein the liquid composition does not comprise a solvent and does not comprise an adhesion promoter.

Also provided is a liquid base coat composition, comprising or consisting of one or more UV oligomers comprising or consisting of at least one aliphatic urethane acrylic oligomer; at least one acrylate diluent monomer selected from a mono-, bi-, and tri-functional reactive acrylate diluent monomers; at least one photo-initiator; a non-ionic leveling agent; at least one UV absorber; and at least one hindered amine light stabilizer.

Provided is a liquid base coat composition that does not comprise a solvent and does not comprise an adhesion promoter.

A liquid base coat composition is provided that does not comprise a cure enhancer, for example, a surface cure enhancer.

Also provided is a liquid base coat composition wherein the at least one aliphatic urethane acrylic oligomer is present in an amount of from about 35% by weight to about 75% by weight; the at least one acrylate diluent monomer is present in an amount of from about 0% by weight to about 30% by weight; the at least one photo-initiator is present in an amount of from about 1% by weight to about 5% by weight; the at least one UV absorber is present in an amount of from about 1% by weight to about 3% by weight; the at least one hindered amine light stabilizer is present in an amount of from about 1% by weight to about 2% by weight; the at least one antioxidant is present in an amount of from about 1% by weight to about 2% by weight; and the at least one non-ionic leveling agent is present in an amount of from about 0.1% by weight to about 1% by weight based on the total weight of the liquid base coat composition.

The presently described subject matter further provides a method for producing a coated substrate surface, comprising or consisting of providing a substrate surface; applying a liquid primer composition comprising or consisting of a silane adhesion promoter to the substrate surface to produce a primed surface; applying a liquid base coat composition to the primed surface, the liquid base coat composition comprising one or more UV oligomers comprising or consisting of at least one aliphatic urethane acrylic oligomer; at least one acrylate diluent monomer selected from a mono-, bi-, and tri-functional reactive acrylate diluent monomers; and at least one photo-initiator; at least one UV absorber; at least one hindered amine light stabilizer; and the at least one non-ionic leveling agent to produce a base coated surface; and, applying a liquid top coat composition comprising one or more UV oligomers comprising or consisting of at least one aliphatic urethane acrylic oligomer; at least one acrylate diluent monomer selected from a mono- and a bi-functional reactive acrylate diluent monomers; at least one photo-initiator; a non-conductive pigment, an inorganic filler, at least one non-ionic slippery agent; at least one non-ionic UV absorber; at least one hindered amine light stabilizer; and at least one non-ionic antioxidant, onto the base coated surface to produce the coated surface, wherein each of the base coat composition and the top coat composition do not comprise a solvent and do not comprise an adhesion promoter.

The presently described subject matter further provides a method for producing a coated surface, comprising or consisting of providing a substrate surface; applying a liquid primer coat composition comprising a silane adhesion promoter to the substrate surface to produce a primed surface; applying a liquid base coat composition to the primed surface, the liquid base coat composition comprising or consisting of one or more UV oligomers comprising or consisting of at least one aliphatic urethane acrylic oligomer; at least one acrylate diluent monomer selected from a mono-, bi-, and tri-functional reactive acrylate diluent monomers; at least one photo-initiator; at least one UV absorber; at least one hindered amine light stabilizer; at least one antioxidant and a leveling agent, to produce a base coated surface; and applying a liquid top coat composition comprising one or more UV oligomers comprising or consisting of at least one aliphatic urethane acrylic oligomer; at least one acrylate diluent monomer selected from a mono- and a bi-, functional reactive acrylate diluent monomers; at least one photo-initiator; a non-conductive pigment, at least one non-ionic slippery agent; at least one non-ionic UV absorber; at least one hindered amine light stabilizer, and at least one non-ionic antioxidant, onto the base coated surface to produce the coated surface, wherein each of the base coat composition and the top coat composition do not comprise a solvent and do not comprise an adhesion promoter.

The presently described subject matter also provides a method for producing a coated substrate surface, wherein the substrate surface is $SiO_2$.

The presently described subject matter further provides a method for producing a coated substrate surface, wherein the substrate is a PV module.

The presently described subject matter provides a method for producing a coated substrate surface, further comprising after applying a liquid base coat, curing the base coated surface. Curing can comprise curing with UV light.

The presently described subject matter also provides a method for producing a coated substrate surface, further comprising after applying a liquid top coat, curing the coated surface. Curing can comprise curing with UV light.

The presently described subject matter further provides a method for producing a coated substrate surface, wherein curing comprises exposing the base coated surface and/or the coated surface to UV light.

The presently described subject matter also provides a method for producing a coated substrate surface, wherein the liquid primer coat composition comprises a wetting agent. The wetting agent may comprise or consist of a non-ionic wetting agent.

The presently described subject matter also provides a method for producing a coated PV module, comprising providing a PV module surface; applying a liquid silane adhesion promoter to the PV module surface to produce a primed surface; applying a liquid base coat composition to the primed surface, the liquid base coat composition comprising one or more UV oligomers comprising or consisting of at least one aliphatic urethane acrylic oligomer; at least one acrylate diluent monomer selected from a mono-, bi-, and tri-functional reactive acrylate diluent monomers; at least one photo-initiator; at least one UV absorber; at least one hindered amine light stabilizer; and at least one non-ionic leveling agent, to produce a base coated surface; and applying a liquid top coat composition comprising one or more UV oligomers comprising or consisting of at least one aliphatic urethane acrylic oligomer; at least one acrylate diluent monomer selected from a mono- and a bi-functional reactive acrylate diluent monomers; at least one photo-initiator; a non-conductive pigment, at least one non-ionic slippery agent; at least one non-ionic UV absorber; at least one hindered amine light stabilizer; and at least one non-ionic antioxidant, onto the base coated surface to produce the coated PV module, wherein each of the base coat composition and the top coat composition do not comprise a solvent and do not comprise an adhesion promoter.

The presently described subject matter further provides a method for producing a coated PV module, comprising or consisting of providing a PV module surface; applying a primer coating composition comprising or consisting of a silane adhesion promoter to the PV module surface to produce a primed surface; applying a liquid base coat composition to the primed surface, the liquid base coat composition comprising or consisting of one or more UV oligomers comprising or consisting of at least one aliphatic urethane acrylic oligomer; at least one acrylate diluent monomer selected from a mono-, bi-, and tri-functional reactive acrylate diluent monomers; at least one photo-initiator; at least one UV absorber; at least one hindered amine light stabilizer; at least one antioxidant; and a leveling agent, to produce a base coated surface; and applying a liquid top coat composition comprising or consisting of one or more UV oligomers comprising or consisting of at least one aliphatic urethane acrylic oligomer; at least one acrylate diluent monomer selected from a mono- and a bi-functional reactive acrylate diluent monomers; at least one photo-initiator; a non-conductive pigment, at least one non-ionic slippery agent; at least one non-ionic UV absorber; at least one hindered amine light stabilizer; and at least one non-ionic antioxidant, onto the base coated surface to produce the coated PV module, wherein each of the base coat composition and the top coat composition do not comprise a solvent and do not comprise an adhesion promoter.

The presently described subject matter also provides a coated PV module produced by the method for producing a coated PV module.

The presently described subject matter provides a coated PV module, comprising a PV module having a surface; a primer coat comprising a liquid silane adhesion promoter provided on the surface to produce a primed surface; a base coat provided on the primed surface, the base coat comprising one or more UV oligomers comprising or consisting of at least one aliphatic urethane acrylic oligomer; at least one acrylate diluent monomer selected from a mono-, bi-, and tri-functional reactive acrylate diluent monomers; at least one photo-initiator; at least one UV absorber; at least one hindered amine light stabilizer; and at least one non-ionic leveling agent, to produce a base coated surface; and a top coat provided on the base coated surface, the top coat comprising one or more UV oligomers comprising or consisting of at least one aliphatic urethane acrylic oligomer; at least one acrylate diluent monomer selected from a mono- and a bi-functional reactive acrylate diluent monomers; at least one photo-initiator; a non-conductive pigment, at least one non-ionic slippery agent; at least one non-ionic UV absorber; at least one hindered amine light stabilizer; and at least one non-ionic antioxidant, to produce the coated PV module, wherein each of the base coat and the top coat do not comprise an adhesion promoter.

The presently described subject matter also provides a coated PV module, comprising or consisting of a PV module having a surface, a primer coat comprising a liquid silane adhesion promoter provided on the surface to produce a primed surface; a base coat provided on the primed surface, the base coat comprising one or more UV oligomers comprising at least one aliphatic urethane acrylic oligomer; at least one acrylate diluent monomer selected from mono-, bi-, and tri-functional reactive acrylate diluent monomers; at least one photo-initiator; at least one UV absorber; at least one hindered amine light stabilizer; at least one antioxidant; and a leveling agent, to produce a base coated surface; and a top coat provided on the base coated surface, the top coat comprising one or more UV oligomers comprising at least one aliphatic urethane acrylic oligomer; at least one acrylate diluent monomer selected from a mono- and a bi-functional reactive acrylate diluent monomers; at least one photo-initiator; a non-conductive pigment, at least one non-ionic slippery agent; at least one non-ionic UV stabilizer; and at least one non-ionic antioxidant, to produce the coated PV module, wherein each of the base coat and the top coat do not comprise an adhesion promoter.

The presently described subject matter also provides a coated PV module, wherein the aliphatic urethane acrylic oligomer comprises aliphatic urethane acrylate, and the diluting monomer comprises isobornyl acrylate.

Further provided is a coating system comprising or consisting of a liquid primer coat composition; a liquid base coat composition; and a liquid top coat composition as presently described.

The presently described subject matter also provides a coating system, comprising or consisting of a liquid primer coat composition comprising a silane adhesion promoter; a liquid base coat composition comprising one or more UV oligomers comprising or consisting of at least one aliphatic urethane acrylic oligomer; at least one acrylate diluent monomer selected from a mono-, bi-, and tri-functional reactive acrylate diluent monomers; a leveling agent; and at least one photo-initiator, that does not comprise a surface cure agent; and a liquid top coat composition comprising or consisting of one or more UV oligomers comprising or consisting of at least one aliphatic urethane acrylic oligomer; at least one acrylate diluent monomer selected from a mono- and a bi-, functional reactive acrylate diluent monomers; at least one photo-initiator; and a non-conductive pigment, wherein each of the base coat composition and the top coat composition do not comprise a solvent and do not comprise an adhesion promoter.

The presently described subject matter also provides a coating system, wherein the base coat composition further comprises one or more of a UV absorber; a hindered amine light stabilizer; and an antioxidant.

The presently described subject matter further provides a coating system, wherein the top coat composition further comprises one or more of a slippery agent; a filler; a defoamer; an antioxidant; a UV absorber; a hindered amine light stabilizer; and a cure enhancer.

The presently described subject matter also provides a coating system, wherein the base coat composition further comprises a UV absorber, a hindered amine light stabilizer, and an antioxidant; and the top coat composition further comprises a slippery agent, a filler, a defoamer, an antioxidant, a UV absorber; a hindered amine light stabilizer, and a cure enhancer.

BRIEF DESCRIPTION OF THE FIGURES

In the detailed description presented below, reference is made to the accompanying drawings in which.

DETAILED DESCRIPTION

In the following detailed description, the methods of the present subject matter can be performed in a number of different variations, and it is to be understood that other embodiments may be utilized and logical changes may be made without departing from the scope of the present subject matter. The following detailed description, therefore, is not to be taken in a limiting sense, and the scope of the present subject matter is defined by the appended claims.

DEFINITIONS

The below definitions serve to provide a clear and consistent understanding of the specification and claims, including the scope to be given such terms.

The term "additive" means one or more agents including for example, one or more of a non-ionic UVA absorber, a hindered amine light stabilizer, a non-ionic antioxidant, a non-ionic defoamer, a non-ionic wetting agent, a non-ionic slippery agent and a non-ionic leveling agent. Other additives can include, a filler, a pigment and a cure enhancing agent. One or more of the non-ionic defoamer, the non-ionic slippery agent, the non-ionic wetting agent and the non-ionic leveling agent can comprise one or more non-ionic surfactants. Any one or more of the non-ionic additives, such as, for example, the non-ionic UVA absorber, non-ionic antioxidant, non-ionic defoamer, non-ionic wetting agent, non-ionic slippery agent, non-ionic leveling agent, non-ionic leveling agent and non-ionic surfactant, may be substituted with a corresponding ionic or cationic additive according to the present subject matter.

The term "adhesion promoter" means an agent that promotes adhesion, for example, between a substrate surface and a polymer, and/or a base coated substrate surface and a polymer. Suitable adhesion promoters can comprise silane adhesion promoters including, for example, gamma-mercaptopropyltrimethoxysilane and gamma-methacryltrimethoxysilane. Suitable adhesion promoters can include, but are not limited to, one or more of an acrylated silane coupling agent, mercapto silane coupling agent. Suitable silane coupling agents can comprise those described in U.S. Pat. No. 5,363,994 hereby incorporated by reference herein in its entirety.

The term "applying" means providing a liquid composition on a surface. Applying can comprise or consist of any one or more of, roll coating, slot die coating, and curtain coating. Applying may not comprise spraying, screen printing, dip coating and/or brushing.

The term "acrylate diluent monomer" means any acrylate monomer that is useful for adjusting viscosity, and exhibits one or more of good weatherability, high reactivity, low shrinkage, good adhesion, non-rigid structure to have no microcracking after humidity freezing. Suitable acrylate diluent monomers can comprise or consist of one or more aliphatic mono, di- and tri-functional reactive acrylate diluent monomers. Suitable diluting acrylate monomers for use in the presently described base coat compositions can comprise or consist of one or more aliphatic mono, bi- and tri-functional reactive acrylate diluent monomers. Suitable acrylate diluent monomers for use in the presently described top coat compositions can comprise or consist of one or more aliphatic mono, and bi-functional reactive acrylate diluent monomers.

The term "cure enhancer" means any agent that enhances curing of a presently described coating. Suitable cure enhancers can comprise or consist of an acrylated amine synergist, for example, CN 371, CN 373, CN383US, CN 384US, CN386US (available from Sartomer); Ebecryl 7100, Ebecryl 104, Ebecryl P115 (available from Cytec).

The term "filler" means an agent for use in the presently described top coat composition that renders the top coat abrasion/scratch resistant and/or reduces the coefficient of thermal expansion ("CTE"). Suitable fillers can comprise or consist of fumed silica such as CT 9707 (available from Cabot), polyamide spheres such as Orgasol 2001 UD NAT 1 (available from Arkema), and precipitated silica Tixosil 333 (available from Rhodia).

The term "antioxidant" means an agent that is capable of slowing or preventing the oxidation of other molecules. The antioxidant may be a non-ionic antioxidant, and anionic antioxidant or a cationic antioxidant. Suitable non-ionic antioxidants can comprise one or more of sterically hindered phenols such as IRGANOX® 1010, IRGANOX® 1035, IRGANOX® 1076 (available from Ciba®).

The term "defoamer" means an agent that prevents foam from forming or destroys foam once it has formed. The defoamer may be a non-ionic defoamer, and anionic defoamer or a cationic defoamer. Suitable non-ionic defoamers can comprise or consist of one or more non-ionic surfactants, for example, BYK088, BYK 1796 (available from BYK-chemie), Surfynol MD 40, Surfynol MD 20, Enviro-Gem AD 01 (available from Air products and chemicals).

The term "leveling agent" means an agent that decreases the surface tension of a coating composition rendering the coating more level. The leveling agent may be a non-ionic leveling agent, and anionic leveling agent or a cationic leveling agent. Suitable non-ionic leveling agents can comprise or consist of one or more non-ionic surfactants, such as BYK 356, BYK 3530.BYK 3500, BYK 3510BYK 3570.

The term "wetting agent" means an agent that permits wetting of a substrate surface by a liquid coat composition. The wetting agent may be a non-ionic wetting agent, and anionic wetting agent or a cationic wetting agent. Suitable non-ionic wetting agents can comprise, but are not limited to, one or more surfactants, for example, one or more nonionic surfactants. Suitable non-ionic surfactants can comprise or consist of BYK 3500 (available from BYK) and Tergitol TMN-6 (Dow Chemical).

The term "nonporous" means that liquids will not penetrate the surface of the substrate under normal atmospheric conditions.

The term "photo initiator" means an agent that when present in a composition exposed to the correct energy and irradiance in a required band of UV light, polymerization occurs and so the composition hardens or cures. Suitable photo initiators can comprise, but are not limited to Escacure TPO, Escacure one (available from Sartomer), IRGACURE 819, IRGACURE 369, IRGACURE 907, IRGACURE 2022, Darocur 1173, Darocur 4065 and benzophenone (available from Ciba).

The term "slippery agent" means an agent that is used to decrease the coefficient of friction of the coating surface which results in high scratch resistance. Suitable slippery agents can comprise or consist of one or more of BYK 3500, BYK 3510, BYK 302, BYK 3570, and BYK 333 (available from BYK). A slippery agent decreases the surface tension of the coated film, while a wetting agent causes the coating solution to have a lower surface tension than that of the substrate so that the coating solution can wet the substrate. The liquid top coat composition can comprise a slippery agent. Some surfactants can function as both a slippery agent and a leveling agent.

The term "solvent" means an organic solvent or an aqueous solvent.

The term "substrate" means an article having a surface, for example, having a nonporous and/or a porous surface. Suitable substrates can comprise SiOx, e.g., $SiO_2$, glass, metal, porcelain, coated metal, a ceramic, a metal alloy, a plastic, a composite, and/or a combination of any two or more thereof. Suitable substrates can include solar modules, for example, a PV module.

The term "UV oligomer" means any UV oligomer that exhibits any one or more of high flexibility, a functionality of about 2, good adhesion and good weatherability. The UV oligomer for the base coating has an elongation of greater than 100%, and a tensile strength of less than 200 psi. The UV oligomer for the top coating has a tensile strength greater than 5000 psi. Suitable UV oligomers can comprise or consist of one or more urethane acrylic oligomers.

The term "UV stabilizer" means an agent that stabilizes a polymer coating under exposure to light. The UV stabilizer can contain two groups of agents, i.e., UV absorbers (absorbs UV light) and hindered amine light stabilizers (quenches radicals produced by UV light). Suitable UV stabilizers can comprise or consist of one or more of a UVA absorber and a hindered amine light stabilizer (HALS). Suitable UV absorbers can comprise, but are not limited to, TINUVIN® R 796 (2-2(2'-hydroxy-5'methacryloxyethylphenyl)-2H-benzotriazole available from Ciba®); and TINUVIN® 400 (Hydroxyphenyltriazine), TINUVIN® 900, TINUVIN®928, (available from Ciba®). Suitable hindered amine light stabilizers (HALS) can comprise, but are not limited to, TINUVIN® 292, TINUVIN® 123, TINUVIN® 770 (available from Ciba®).

The term "UV light" means electromagnetic radiation with a wavelength shorter than that of visible light, but longer than soft X-rays. UVA light has a wavelength of 400 nm to 315 nm. UVB light has a wavelength of 315 nm to 280 nm. UVC light has a wavelength of 280 nm to 100 nm.

It is noted that, as used in this specification and the appended claims, the singular forms "a," "an" and "the" include plural references unless the context clearly dictates otherwise.

Unless defined otherwise all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language; however, it will be understood by one of skill in the art, that in some specific instances, an embodiment can alternatively be described using the language "consisting essentially of" or "consisting of."

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The Primer Coat Composition

The primer layer can comprise a UV curable reactive silane coupling agent, a hydrophobic moisture resistance silane and a wetting agent. The primer layer is an ultra thin layer provided on a SiOx surface that enhances adhesion of a radiation curable conformal coating to SiOx. The primer coat composition can comprise an aqueous solution which is environmental friendly. It has fast cure rate at 40° C. and long pot lifetime (>2 weeks).

The presently described primer coat composition can comprise or consist of one or more adhesion promoters, for example, one or more silane adhesion promoters, Suitable silane adhesion promoters can include one or more of an acrylated silane adhesion promoters and a mercapto silane adhesion promoter. The primer coat composition can comprise or consist of water as a carrier, wherein the silane adhesion promoter can be present in an amount of from about 0.05% by weight to about 0.3% by weight based on the total weight of the primer coat composition.

The aqueous primer coat composition can optionally include a hydrophobic agent which is, for example, a functionalized alkylsilane. The hydrophobic agent is used in applications in which water resistance properties are important. The hydrophobic agent is optional, and resists moisture and inhibits dissociation upon exposure to water. A suitable hydrophobic agent is a functionalized hydrocarbysilane. The hydrophobic agent can be present in an amount of 0% by weight to about 0.4% by weight, from about greater than 0% by weight to about 0.35% by weight based on the total weight of the primer coat composition. Other suitable hydrophobic agents can be readily selected an employed by one of ordinary skill in the art to which the present subject matter relates, without undue experimentation and can include, for example, one or more of Z-6070, Z-6403, Z-6582, Z-6265, Z-6040, Z-6264, and Z-6124 (available from Dow corning).

In addition, the aqueous primer coat composition can include an optional wetting agent. Suitable wetting agents can include surfactants, for example, a nonionic surfactant. The surfactant is used to permit wetting of the substrate by the primer solution. Suitable surfactants can include TERGITOL TMN-6 (Union Carbide). The surfactant can be present in the composition in an amount of from about 0.01% by weight to about 0.05% by weight based on the total weight of the primer coat composition. Other suitable surfactants can be readily selected an employed by one of ordinary skill in the art to which the present subject matter relates, without undue experimentation.

An acid can be optionally employed in order to inhibit condensation or oligomerization of the silane adhesion promoter. Suitable acids include acetic acid, hydrochloric acid, and other carboxylic acids. The acid can be used in an amount effective to adjust the pH of the primer coat composition to from about 2 to about 5.5.

Other excipients may be added to the extent that they are compatible with the primer coat composition. The primer coat composition can comprise or consist of an adhesion promoter, optionally water, optionally a hydrophobic agent, optionally an acid, and optionally a wetting agent. The primer coat composition is coated on a substrate, such as a solar panel, in an ultra-thin layer (i.e., a monolayer of adhesion promoter).

The Base Coat Composition

The radiation curable base coat of presently described subject matter exhibits good adhesion to a SiOx substrate, good electrical insulation, and flexibility over operation temperatures. The UV oligomer for the base coat composition can comprise or consist of a di-functional aliphatic urethane acrylate. In order to achieve good adhesion and flexibility, the elongation of the UV oligomer is higher than 100%, and the tensile strength is lower than 200 psi, for example from 100 to less than 200 psi. The acrylate diluent monomer is chosen from mono, di- and tri-functional monomers. The purpose of the reactive diluent monomer is to adjust viscosity and to control the mechanical properties of the base polymer coating by using mono, di- or tri-functional monomers. At the same time, in order to have good interface adhesion of base coat to the top coating, there needs to be enough reactive C=C double bonds left on the surface of base coating to react with top coating composition. Surface cure of the base coating is controlled by using photo initiator that achieves through-cure only and does not achieve surface-cure. Secondly, surface C=C double bond conversion is controlled by adjusting the UV radiation cure dosage. The photo initiator is chosen from Irgacure 819, or TPO, which are good for through-cure only.

The base coat composition can comprise or consist of one or more UV oligomers comprising or consisting of at least one aliphatic urethane acrylic oligomer; at least one acrylate diluent monomer selected from a mono-, bi-, and tri-functional reactive acrylate diluent monomers that can comprise, for example, one or more of an acrylic monomer and a methacrylic monomer; at least one photo-initiator; at least one UV absorber; at least one hindered amine light stabilizers; and optionally a leveling agent. The base coat composition does not comprise a solvent and does not comprise an adhesion promoter. Optionally, the base coat composition does not comprise an isobornyl acrylate monomer or the base coat composition can comprise a mixture of at least one aliphatic urethane acrylic oligomer and a UV oligomer that is not an aliphatic urethane acrylic oligomer.

The urethane acrylic oligomer can comprise or consist of one or more of aliphatic urethane acrylate, aliphatic urethane diacrylate, and aliphatic urethane triacrylate. The urethane acrylic oligomer can be diluted with the monomer 1,6-hexanediol diacrylate. The urethane acrylic oligomer can be present in the base coat composition in an amount of from about 20% by weight to about 75% by weight, from about 30% by weight to 60% by weight, or from about 35% by weight to about 50% by weight, based on the total weight of the base coat composition.

The at least one acrylate diluent monomer can comprise or consist of one or more of isobornyl acrylate; alkanediol diacrylate, for example, 1,6-hexanediol diacrylate; alkoxylated derivatives and mixtures thereof. The at least one acrylate diluent monomer is present in the base coat composition in an amount of from about 10% by weight to about 40% by weight, or from about 15% by weight to about 30% by weight based on the total weight of the base coat composition.

The at least one photo-initiator can comprise or consist of one or more of Irgacure 819, TPO and mixtures thereof. The photo-initiator can be present in the base coat composition in an amount of from about 0.5% by weight to about 10% by weight, from about 1% weight to about 5% by weight, from about 2% by weight to about 4% by weight or about 3% by weight based on the total weight of the base coat composition.

The at least one UV absorber is present in an amount of from about 1% by weight to about 3% by weight, the at least one hindered amine light stabilizers is present in an amount of from about 1% by weight to about 2% by weight, and the at least one antioxidant is present in an amount of from about 1% by weight to about 2% by weight based on the total weight of the base coat composition. The base coat composition can optionally comprise one or more additives, for example, a non-ionic leveling agent. Suitable leveling agents can include polyether modified acryl functional polydimethylsiloxane, for example, BYK3530 (available from BYK). The leveling agent can be present in the base coat composition in an amount of from about 0.1% by weight to about 1.0% by weight, from about 0.2% by weight to about 0.8% by weight, or about 0.6% by weight based on the total weight of the base coat composition. Suitable leveling agents can include BYK 350, BYK 356, BYK 361N, and BYK 359. Other suitable leveling agents can be readily selected an employed by one of ordinary skill in the art to which the present subject matter relates, without undue experimentation.

The base coat composition is coated onto a substrate surface or a primer coated substrate surface in a layer having a thickness of from about 1 mil to about 5 mil, from about 2 mil to about 4 mil, or of about 3 mil.

The Top Coat Composition

The radiation curable top coat composition of the presently described subject matter provides good adhesion to the base coating, good electric insulation, scratch resistance, weathering resistance and UV resistance. The top coating composition can include di-functional aliphatic urethane acrylate with tensile strength >5000 psi. The UV oligomer provides good toughness and non-cracking after thermal cycle, humidity freezing, and damp heat tests. Mono- and di-functional reactive acrylate diluent monomers are used to adjust viscosity and cross-link density of the coating. In order to have good scratch resistance, the composition must have good surface-cure. Suitable photo initiators can include benzophenone and tertiary amine as a synergist to achieve good surface-cure, as well as TPO for good through-cure. The top coating composition can also contain a non-conductive pigment, i.e., a non-conductive black pigment, in order to block UV light. Most black pigments have poor electric insulation properties. Austin black 325 has very good insulation properties. The top coating with such black pigment has a dielectric strength >2000V/mil, for example, 2000 to 2500V/mil. Silica filler is added to the top coating composition to reduce the CTE of the top polymer coating. Lower CTE can help the top polymer coating pass thermal cycle accelerating tests. Additives can be included in the top coating composition, for example, a non-ionic UV absorber, a hindered amine light stabilizer and an antioxidant are used for long term stabilization of the coating in an outdoor environment. A non-ionic slippery agent can be used for decreasing the coefficient of friction of the coating surface which results in high scratch resistance. One or more of a non-ionic defoamer and a leveling agent can be used to achieve good coating appearance.

The top coat composition can comprise or consist of one or more UV oligomers comprising or consisting of at least one aliphatic urethane acrylic oligomer; at least one acrylate diluent monomer selected from mono- and bi-functional reactive acrylate diluent monomers that can comprise, for example, one or more of an acrylic monomer and a methacrylic monomer; at least one photo-initiator; a non-conductive pigment; one or more UV stabilizing agents; optionally a slippery agent; optionally an antioxidant; optionally a defoamer; optionally a cure enhancing agent; and optionally a flame retardant.

The urethane acrylic oligomer can comprise or consist of one or more of aliphatic urethane acrylate, aliphatic urethane diacrylate, and aliphatic urethane triacrylate. The urethane acrylic oligomer can be diluted with the diluting monomer 1,6-hexanediol diacrylate. The urethane acrylic oligomer can be present in the top coat composition in an amount of from about 40% by weight to about 80% by weight, from about 50% by weight to about 70% by weight, or from about 60% by weight to about 65% by weight, based on the total weight of the base coat composition. The one or more UV oligomers can be present in the base coat composition in an amount of from about 35% by weight to about 95% by weight, from about 40% by weight to about 80% by weight, or from about 50% by weight to about 70% by weight based on the total weight of the top coat composition.

The at least one acrylate diluent monomer can comprise or consist of one or more of isobornyl acrylate; alkanediol diacrylate, for example, 1,6-hexanediol diacrylate; alkoxylated derivatives and mixtures thereof. The at least one diluting monomer is present in the top coat composition in an amount of from about 10% by weight to about 30% by weight, from about 15% by weight to about 25% by weight, or about 20% based on the total weight of the top coat composition.

The at least one photo-initiator can comprise or consist of one or more of benzophenone, IRGACURE 819, TPO and mixtures thereof. Suitable photo-initiators can comprise or consist of benzophenone and one or more of IRGACURE 819, Darocur 1173, Escacure one and TPO. The photo-initiator can further include a tertiary amine as a synergist (cure enhancer). The photo-initiator can be present in the top coat composition in an amount of from about 0.5% by weight to about 10% by weight, from about 1% weight to about 5% by weight, from about 2% by weight to about 4% by weight or about 3% by weight based on the total weight of the top coat composition. The amine synergist can be present in the top coat composition in an amount of from about 3% by weight to about 15% by weight, from about 5% weight to about 10% by weight, or about 7% by weight based on the total weight of the top coat composition.

The non-conductive pigment can comprise any pigment that is non-conductive. Suitable non-conductive pigments can comprise or consist of Austin black 325 (available from Coal Fillers Corp.). The non-conductive pigment can be present in the top coat composition in an amount of from about 0.5% by weight to about 10% by weight, from about 2% by weight to about 8% by weight, or at about 4% by weight based on the total weight of the top coat composition. Suitable non-conductive pigments can include one or more of titanium dioxide, R960, and R900 (available from Dupont). Other non-conductive pigments can be readily selected an employed by one of ordinary skill in the art to which the present subject matter relates, without undue experimentation.

The one or more non-ionic UV stabilizing agents can comprise or consist of one or more of a UVA absorber and a hindered amine light stabilizer. Suitable UV absorbers can comprise or consist of TINUVIN 400 and TINUVIN 796 (both available from Ciba). Suitable hindered amine light stabilizers can comprise or consist of TINUVIN 123 and TINUVIN 292 (both available from Ciba). The one or more non-ionic UV stabilizing agents can be present in the top coat composition in an amount of from about 0.5% by weight to about 10% by weight, from about 1% by weight to about 6% by weight, from about 2% by weight to about 4% by weight, or at about 3% by weight based on the total weight of the top coat composition. Suitable non-ionic UV stabilizing agents can include one or more of TINUVIN 928, TINUVIN900, TINUVIN328, TINUVIN770, and TINUVIN144. Other suitable non-ionic UV stabilizing agents can be readily selected an employed by one of ordinary skill in the art to which the present subject matter relates, without undue experimentation.

The non-ionic slippery agent can comprise a surfactant, for example, a non-ionic surfactant. Suitable non-ionic surfactants can comprise or consist of BYK 3500 (available from BYK). The non-ionic slippery agent can be present in the top coat composition in an amount of from about 0.05% by weight to about 1% by weight, from about 0.1% by weight to about 0.5% by weight, or at about 0.3% by weight based on the total weight of the top coat composition. Suitable non-ionic slippery agents can include BYK 3510, BYK 302, BYK 3570, and BYK 333. Other suitable non-ionic slippery agents can be readily selected and employed by one of ordinary skill in the art to which the present subject matter relates, without undue experimentation.

The non-ionic defoamer can comprise or consist of, for example, BYK 088 (available from BYK). The non-ionic defoamer can be present in the top coat composition in an amount of from about 0.1% by weight to about 2% by weight, from about 0.2% by weight to about 1% by weight, or at about 0.6% by weight based on the total weight of the top coat composition. Suitable non-ionic defoamers can include BYK 1790, BYK 066N, BYK-A 351, BYK 020, and EnviroGem AD01. Other suitable non-ionic defoamers can be readily selected an employed by one of ordinary skill in the art to which the present subject matter relates, without undue experimentation.

The non-ionic antioxidant can comprise or consist of, for example, one or more of IRGANOX 1010, IRGANOX1035, and IRGANOX1076 (available from Ciba-Geigy). The non-ionic antioxidant can be present in the top coat composition in an amount of from about 0.5% by weight to about 5% by weight, from about 1% by weight to about 4% by weight, or at about 2% by weight based on the total weight of the top coat composition. Other suitable non-ionic antioxidants can be readily selected an employed by one of ordinary skill in the art to which the present subject matter relates, without undue experimentation.

The cure enhancing agent can comprise or consist of one or more amine synergists for example one or more tertiary amines, i.e., CN 371 and CN373 (Sartomer). The cure enhancing agent can be present in the top coat composition in an amount of from about 5% by weight to about 10% by weight, from about 6% by weight to about 8% by weight, or at about 7% by weight based on the total weight of the top coat composition. Other suitable cure enhancing agents can be readily selected an employed by one of ordinary skill in the art to which the present subject matter relates, without undue experimentation.

The top coat composition can optionally comprise one or more flame retardants.

The top coat composition is coated onto a substrate surface or a primer coated substrate surface or a base coated substrate surface in a layer having a thickness of from about 1 mil to about 5 mil, from about 2 mil to about 4 mil, or of about 3 mil.

Radiation Curing

The UV irradiation used for curing the coating compositions of the present invention in principle may be any UV source having an output spectra showing one or more peaks at wavelengths between 200 and 500 nanometer (nm). Particularly suitable UV sources are Fusion bulb lamps (Fusion is a trade mark) having output maxima at 260-270 nm, 320 nm and 360 nm ("H" bulb), at 350-390 nm ("D" bulb) or at 400-430 nm ("V" bulb). Combinations of these Fusion bulb lamps may also be used. H and D bulb lamps (linear power 300 W/inch) are particularly useful, while a combination of D bulb and H bulb can also be suitably applied.

The exposure to UV irradiation may be performed by any known method. A suitable method for instance is exposing a composition coated substrate to UV irradiation by passing the composition coated substrate at a certain speed (expressed in meters per minute, m/min) underneath the UV source. If necessary, the exposure to irradiation may be repeated one or more times, e.g. by repeatedly passing the composition coated substrate underneath the UV source or by passing the composition coated substrate underneath two or more lamps positioned in series, in order to accomplish sufficient curing. The lower the total irradiation dose and the higher the speed with which the composition coated substrate can be passed underneath the UV source for obtaining sufficient and satisfactory curing, the better the curing ability of the composition coated substrate. For the base coating, curing dosage is 1.26 w/cm$^2$ (UV A), and 1.16 w/cm$^2$ (UV V). For the top coating, the curing dosage is 5.68 w/cm$^2$ (UV A) and 5.30 w/cm$^2$ (UV V)

Figure 1:
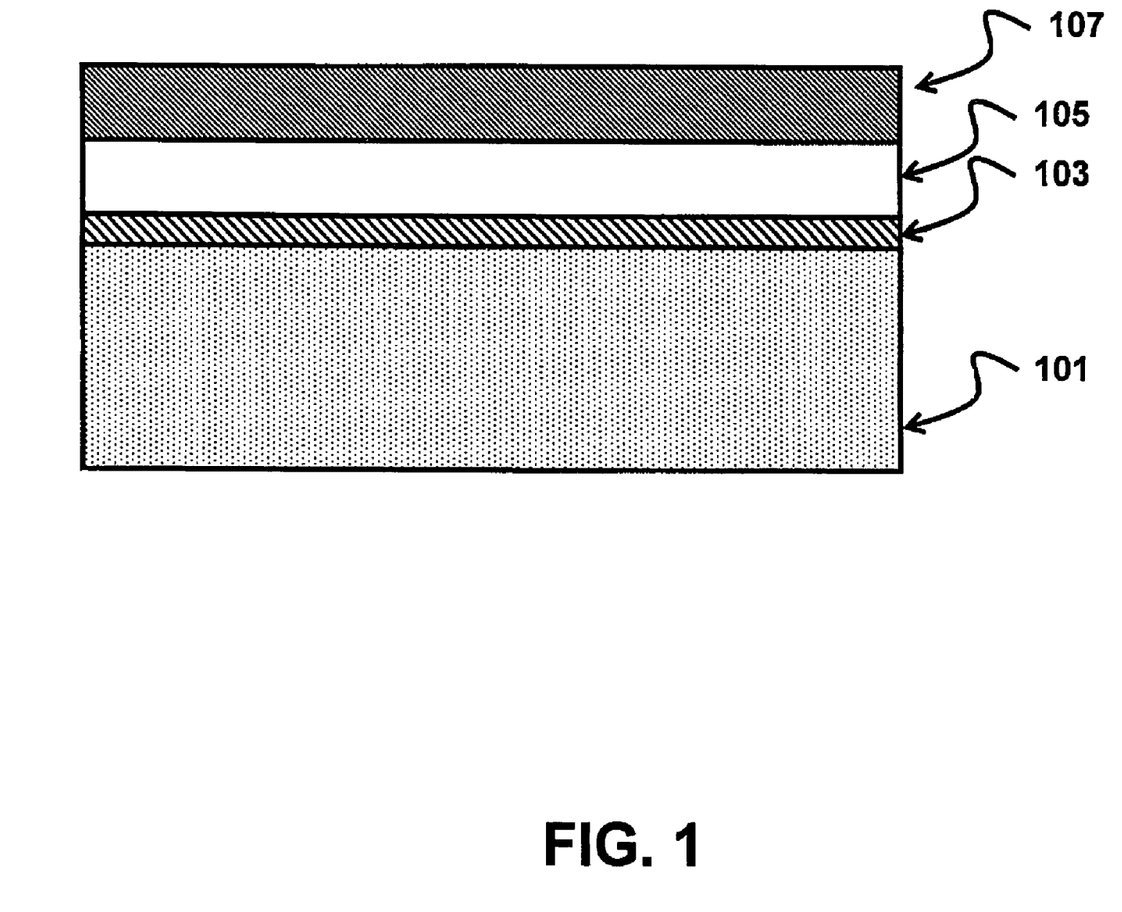
FIG. 1 illustrates a cross-section view of the presently described coated thin film PV module.

FIG. 1 illustrates a cross-section view of the presently described coated thin film PV module comprising a PV module 101, having a ultra-thin primer coat layer 103 provided thereon, a 3 mil base coat layer 105 provided on the primer coat, and a 3 mil top coat layer 107 provided on the base coat layer.

The following examples are illustrative of the present topical cosmetic compositions and are not intended to be limitations thereon. Any polymer molecular weights are mean average molecular weights. All percentages are based on the percent by weight of the final delivery system or formulation prepared unless otherwise indicated and all totals equal 100% by weight.

EXAMPLES

Example 1

Primer Coat Composition

A primer solution was prepared by adding Z6030, Z6070 and TMN-6 in DI water as shown below and the pH was adjusted using acetic acid to 4.1. The solution was stirred at 40° C. for 10 min. before application to the substrate. After stirring, the primer solution was applied with a glass rod in a monolayer to the surface of a PV module. The primer is dried and cured by drying with a heat blower at 40° C. for 1 min.

| Component | Percentage | Name |
|---|---|---|
| Z-6030 | 0.5% | silane coupling agent |
| Z-6070 | 0.3% | hydrophobic silane |
| TMN-6 | 0.05% | non ionic wetting agent |

Example 2a

Base Coat Composition

A base coat composition was prepared by mixing the following components:

| Component | Percentage | Name | Function | Vendor |
|---|---|---|---|---|
| CN966J75 | 68% | Aliphatic urethane | UV oligomer | Sartomer |
| NPG(PO)$_2$DA | 24% | | UV monomer | Cytec |
| BYK3530 | 0.60% | | Leveling agent | BYK |
| TPO | 3% | Diphenyl(2,4,6-trimethylbenzoyl)phosphine oxide | Photo initiator | Sartomer |
| Tinuvin 400 | 2% | | UV absorber | Ciba |
| Tinuvin 123 | 1% | | HALS | Ciba |
| Irganox 1010 | 1% | | antioxidant | Ciba |

Example 2b

Base Coat Composition

A base coat composition was prepared by mixing the following components:

| Component | Percentage | Name | Function | Vendor |
|---|---|---|---|---|
| CN966J75 | 40% | Aliphatic urethane | UV oligomer | Sartomer |
| EB8800 | 24% | Aliphatic urethane | UV oligomer | Cytec |
| SR506 | 29% | Isobornyl acrylate | monomer | Sartomer |
| BYK3530 | 0.60% | | Leveling agent | BYK |
| TPO | 3% | Diphenyl(2,4,6-trimethylbenzoyl)phosphine oxide | Photo initiator | Sartomer |
| Tinuvin 400 | 2% | | UV absorber | Ciba |
| Tinuvin 123 | 1% | | HALS | Ciba |
| Irganox 1010 | 1% | | antioxidant | Ciba |

Example 3

Top Coat Composition

A top coat composition was prepared by mixing the following components:

| Component | Percentage | Name | Function | Vendor |
|---|---|---|---|---|
| EB 284-N | 34% | Aliphatic urethane | UV oligomer | Cytec |
| CN9001 | 14% | Aliphatic urethane | UV oligomer | Sartomer |
| SR238 | 12% | 6-hexanediol diacrylate | Monomer | Sartomer |
| SR506 | 9% | Isobornyl acrylate | Monomer | Sartomer |
| TPO | 3% | | Photo initiator | Sartomer |
| Benzophenone | 2% | | Photo initiator | Sartomer |
| BYK 3500 | 0.3% | | slippery agent | BYK |
| AD01 | 1% | | Defoamer | Air prod. Chem. |
| Austin Black 325 | 8% | | Pigment | Coal Fillers Inc. |
| 2001 UD NAT1 | 5% | | filler | Arkema |
| Tinuvin 400 | 2% | | UV absorber | Ciba-Geigy |
| Tinuvin 123 | 1% | | HALS | Ciba-Geigy |
| Irganox 1010 | 2% | | Antioxidant | Ciba-Geigy |
| CN373 | 7% | Amine Synergist | Cure enhancer | Sartomer |

Example 4

Coated PV Module

A PV module is coated with an ultra-thin layer of the primer coat composition of Example 1. The primer coat is cured at 40 C for a min and the primed PV module is coated with coating rod with a 3 mil layer of the base coat composition of Example 2. The base coat layer is cured with UV radiation, curing dosage is 1.26 w/cm$^2$ (UV A), and 1.16 w/cm$^2$ (UV V). The base coated PV module is then coated with coating rod with a 3 mil layer of the top coat composition of Example 3. The top coat layer is cured with UV radiation, the curing dosage is 5.68 w/cm$^2$ (UV A) and 5.30 w/cm$^2$ (UV V) UVA to produce the coated PV module.

The radiation curable protection conformal coating layers passed electric insulation, including dielectric withstand test (HiPot): 2200V DC applied for 1 min, Leakage<50 uA, and Wet Insulation Resistance Test (Wet HiPot): 500V DC applied for 120 sec. Leakage<10 uA. The coating layers pass thermal cycle (between −40° C. to +85° C. at 100° C./h for 200 cycles), humidity freezing (10 cycles from +85° C., 85% RH to −40° C.), and damp heat (1500 hours of +85° C., 85% RH) tests that are part of UL certification processes. The coating layers passed dielectric withstand test (Dry HiPot and wet HiPot) after the accelerating tests. The coating layers passed the cut test: back side of hacksaw blade draw at 6 in/s speed, 2 lb force exerted at test point. No contacts of blade to back side conductor.

All publications cited in the specification are indicative of the level of skill of those skilled in the art to which the presently described subject matter pertains. All of these publications are hereby incorporated by reference herein to the same extent as if each individual publication were specifically and individually indicated as being incorporated by reference.

The present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

What is claimed is:

1. A coating system, comprising:
  a liquid primer coat composition comprising a silane adhesion promoter;
  a liquid base coat ultraviolet (UV) curable composition comprising one or more UV oligomers comprising at least one aliphatic urethane acrylic oligomer; at least one acrylate diluent monomer selected from a mono-, bi-, or tri-functional reactive acrylate diluent monomers; a leveling agent; and at least one photo-initiator, that does not comprise a surface cure agent; and
  a liquid top coat UV curable composition comprising one or more UV oligomers comprising at least one aliphatic urethane acrylic oligomer; at least one acrylate diluent monomer selected from a mono- or a bi-, functional reactive acrylate diluent monomers; at least one photo-initiator; or a non-conductive pigment,
  wherein each of the base coat composition and the top coat composition do not comprise a solvent and do not comprise an adhesion promoter.

2. The coating system of claim 1, wherein the base coat composition further comprises one or more of a UV absorber; a hindered amine light stabilizer; or an antioxidant.

3. The coating system of claim 1, wherein the top coat composition further comprises one or more of a slippery agent; a filler; a defoamer; an antioxidant; a UV absorber; a hindered amine light stabilizer; or a cure enhancer.

4. The coating system of claim 3, wherein the defoamer comprises a non-ionic defoamer.

5. The coating system of claim 1, wherein the base coat composition further comprises one or more of a UV absorber, a hindered amine light stabilizer, and an antioxidant; and the top coat composition further comprises one or more of a slippery agent, a filler, a defoamer, an antioxidant, a UV absorber, a hindered amine light stabilizer, or a cure enhancer.

6. The coating system of claim 1, wherein the at least one aliphatic urethane acrylic oligomer is present in an amount of from about 35% by weight to about 75% by weight; the at least one acrylate diluent monomer is present in an amount of from about 0% by weight to about 30% by weight; the at least one photo-initiator is present in an amount of from about 1% by weight to about 5% by weight; and the at least one leveling agent is present in an amount of from about 0.1% by weight to about 1% by weight based on the total weight of the liquid base coat composition.

7. The coating system of claim 1, wherein the at least one aliphatic urethane acrylic oligomer is present in an amount of from about 35% by weight to about 70% by weight; the at least one acrylate diluent monomer is present in an amount of from about 15% by weight to about 30% by weight; the at least one photo-initiator is present in an amount of from about 1% by weight to about 5% by weight; the nonconductive pigment is present in an amount of from about 1% by weight to about 10% by weight based on the total weight of the liquid top coat composition.

* * * * *